US011948709B2

(12) United States Patent
Han et al.

(10) Patent No.: US 11,948,709 B2
(45) **Date of Patent: *Apr. 2, 2024**

(54) PHYSICALLY UNCLONABLE ALL-PRINTED CARBON NANOTUBE NETWORK

(71) Applicant: Universities Space Research Association, Columbia, MD (US)

(72) Inventors: Jin-Woo Han, Mountain View, CA (US); Meyya Meyyappan, San Jose, CA (US); Dong-Il Moon, Mountain View, CA (US)

(73) Assignee: Universities Space Research Association, Columbia, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/666,716

(22) Filed: Feb. 8, 2022

(65) Prior Publication Data

US 2022/0310289 A1 Sep. 29, 2022

Related U.S. Application Data

(63) Continuation of application No. 16/710,760, filed on Dec. 11, 2019, now Pat. No. 11,244,775.

(60) Provisional application No. 62/778,041, filed on Dec. 11, 2018.

(51) Int. Cl.

| | |
|---|---|
| ***H01C 7/00*** | (2006.01) |
| ***H01C 1/034*** | (2006.01) |
| ***H01C 1/14*** | (2006.01) |

(52) U.S. Cl.
CPC ............ *H01C 7/006* (2013.01); *H01C 1/034* (2013.01); *H01C 1/14* (2013.01)

(58) Field of Classification Search
None
See application file for complete search history.

(56) References Cited

U.S. PATENT DOCUMENTS

| | | | | |
|---|---|---|---|---|
| 11,244,775 | B2 * | 2/2022 | Han | H01C 1/14 |
| 2015/0281531 | A1 * | 10/2015 | Kato | F03G 7/005 348/374 |
| 2015/0346398 | A1 * | 12/2015 | Gorodetsky | G02B 5/26 359/359 |
| 2017/0291332 | A1 * | 10/2017 | Braley | B32B 7/06 |
| 2018/0006230 | A1 * | 1/2018 | Cao | H01L 51/0098 |
| 2019/0371830 | A1 * | 12/2019 | Hsiao | G06F 3/0445 |

* cited by examiner

*Primary Examiner* — Kyung S Lee
(74) *Attorney, Agent, or Firm* — Whiteford, Taylor & Preston, LLP; Peter J. Davis

(57) ABSTRACT

An all-printed physically unclonable function based on a single-walled carbon nanotube network. The network may be a mixture of semiconducting and metallic nanotubes randomly tangled with each other through the printing process. The unique distribution of carbon nanotubes in a network can be used for authentication, and this feature can be a secret key for a high level hardware security. The carbon nanotube network does not require any advanced purification process, alignment of nanotubes, high-resolution lithography and patterning. Rather, the intrinsic randomness of carbon nanotubes is leveraged to provide the unclonable aspect.

8 Claims, 18 Drawing Sheets

PHYSICALLY UNCLONABLE ALL-PRINTED CARBON NANOTUBE NETWORK

STATEMENT OF GOVERNMENT RIGHTS

This invention was made with Government support under contract number NNA16BD14C awarded by NASA. The Government has certain rights in this invention.

BACKGROUND OF THE INVENTION

Field of the Invention

The present invention relates to methods for generating and using physically unclonable digital fingerprints.

Description of the Background

Traditionally, assets have been secured so that any important information, property or transaction can only be accessed when a key is placed on the lock. Physical locks and keys have changed to electronic versions in the information age, so we create passcodes and store them in electrical devices. Recent smart devices feature even higher level of security measures akin to human fingerprint, iris, and facial recognition, as these methods provide not only unique but also complex patterns and stable characteristics. However, the anticipated tremendous increase in the number of devices in the era of the Internet of things (IoT) would make the lock and key system inadequate. Direct access between things without human intervention is required in the ideal IoT environment and therefore, a unique means of identification of things is critical. There are two major hardware security issues due to the explosive increase in the number of information devices. First, it is difficult to create and assign identification code to each device. Second, it is difficult to safely store the identification codes assigned to the devices. In general, the randomly generated passcode is stored in the memory of the device through an encryption process, but such digital keys are vulnerable to physical attacks.

SUMMARY OF THE INVENTION

In order to address these problems, a physical randomness generated from intrinsic physical imperfections has been introduced as a hardware security method. These random and unique physical imperfections, so-called physically unclonable functions (PUF) have been intensively studied with semiconductor based PUFs. Most materials and devices have structural disorders originating from fabrication processes or inherent defects; accordingly, PUFs may be present in a variety of forms including light, paper, silicon circuits, radio-frequency identification tags, field-programmable gate arrays, memory devices, carbon nanotubes (CNTs), nanoparticles and nanopatterns.

Flexible and printable electronics have been attracting attention in recent years and portable or wearable devices will be networked to meet the IoT era demands. These devices will process various information including personal data. Accordingly, the present invention presents a new and non-obvious method for making and using all-printed carbon nanotube networks as a simple, low-cost, durable, and easy to manufacture PUF.

BRIEF DESCRIPTION OF THE DRAWINGS

FIG. 1A shows a lumped electrode configuration. Two electrodes are placed on a single CNT network, which is equivalent to a number of CNT resistors connected in parallel. The equivalent resistance ($R_{eq}$) is always less than the smallest resistance in the parallel network; thus, the randomness of the resistance between multiple CNT networks is reduced.

FIG. 1B shows a distributed electrode configuration. Sixteen electrodes are formed on a single CNT network, which is equivalent to 120 independent resistors ($N\times(N-1)/2$) from $R_1$ to $R_{120}$ in a single CNT network. Therefore, the distribution and the range of the resistances within a CNT network as well as between other CNT networks are varied.

FIG. 1C shows a box plot with whiskers from minimum to maximum. The middle line of the box plot represents the median of the CNT resistances. As the number of electrodes on the CNT network increases, the minimum value of the CNT resistance is relatively constant, but the range of resistance, median, and maximum value change largely. This is because the internal CNT resistors hidden by a parallel connection can be read independently. The number of internal resistances that can be read increases in proportion to $N^2$, and it becomes difficult to predict each resistance or to assume a range.

FIG. 2A shows a schematic of the proposed PUF with one CNT network (black) and 16 electrodes (gray) on a flexible substrate (brown). The CNT network is located at the center of the chip, and the electrodes are arranged along the periphery of the CNT film. The contact pads connected to the electrodes are located at the edge of the chip for measurement.

FIG. 2B is an image of the fabricated devices on a polyimide substrate showing mechanical flexibility.

FIG. 2C is a microscope image of the CNT PUF showing the boundary between the silver (Ag) electrode and the CNT film. The scale bar is 200 μm.

FIG. 2D is a scanning electron microscope image of the inkjet printed CNTs showing a random network. The scale bar is 1 μm.

FIG. 2E shows the cumulative percentage versus resistance from 11 different PUF devices. Each device has 120 resistance values, and the range and distribution of resistance vary widely.

FIGS. 2F and 2G are contour maps of the CNT PUFs having the red and blue data sets in FIG. 2E, respectively. The two devices have similar resistance distributions, but their contour maps show a different pattern due to the introduction of electrode information.

FIG. 3A shows the histogram of one sample.

FIG. 3B shows the histogram of the combined samples.

FIG. 3C shows the histogram of the four averaged samples.

FIG. 4A shows the results of an electrical endurance test. Comparing the entire internal resistance of the CNT network between one ($R_1$) and 10k ($R_{10k}$) readings, 74 data increased and 46 data decreased in the 120 data points.

FIGS. 4B and 4C show contour maps of the CNT PUF in its initial state and after 10k readings, respectively. There is a change in the individual resistance of the CNT PUF due to electrical stress, but the pattern difference is very slight in the contour map. This is because the proposed CNT PUF utilizes the relative difference without using the absolute value of the individual resistance.

FIGS. 4D, 4E, and 4F show a pattern that consists of 15 resistances through one fixed electrode.

FIG. 4D shows the effect of temperature on CNT PUF at 25° C. (black), 50° C. (green) and 80° C. (red). The resistance decreased by an average of 0.6% per 1° C. (see FIG. 8).

FIG. 4E shows resistance change under various light conditions including dark (black), fluorescent (green) and UV light (red). The resistance changed by an average of 2.1% and 4.5% from dark to fluorescent and UV light.

FIG. 4F shows the results of a radiation exposure experiment. In the case of exposure to gamma ray of 0.1 Mrad, an average resistance change of 11.1% was observed between the pre-radiation (black) and post-radiation (red).

FIG. 6A shows a clam-shell type test socket for the printed devices.

FIG. 6B shows a 16-channel I/O measurement system.

FIG. 9A is a contour maps of pre-radiation CNT PUFs.

FIG. 9B is a contour map of post radiation CNT PUFS. The average resistance change was 11.1%, but the image matching test showed 0.5% difference.

DETAILED DESCRIPTION

The present invention is an all-printed physically unclonable function (PUF) based on a single-walled carbon nanotube (SWCNT) network. According to the invention, the SWCNTs may be a mixture of semiconducting and metallic nanotubes, as even purified samples of one kind typically feature some other minor content. CNTs forming a network are randomly tangled with each other through the printing process. The all-printed CNT PUF according to the invention is attractive in terms of process simplicity, cost-effectiveness and application perspective. A unique distribution of CNTs in a network can be used for authentication, and this feature can be a secret key for a high level hardware security. According to the invention, the CNT network does not require any advanced purification process, alignment of nanotubes, high-resolution lithography and patterning. Rather, the intrinsic randomness of CNTs is leveraged to the advantage of the invention.

Figure 1A:
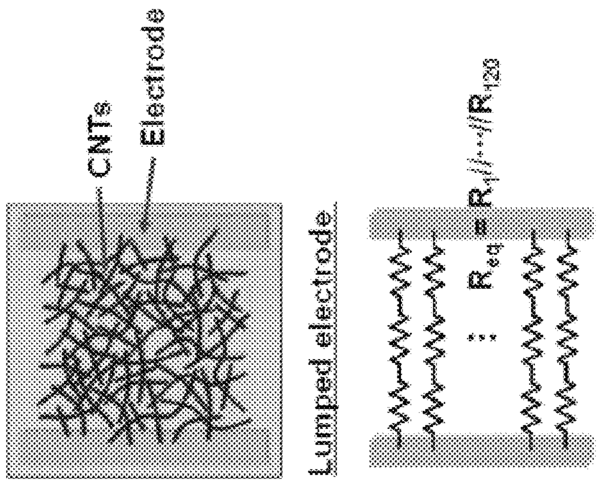
FIGS. 1A-1C show the range of CNT resistances depending on the number of electrodes in a single network.
Figure 1B:
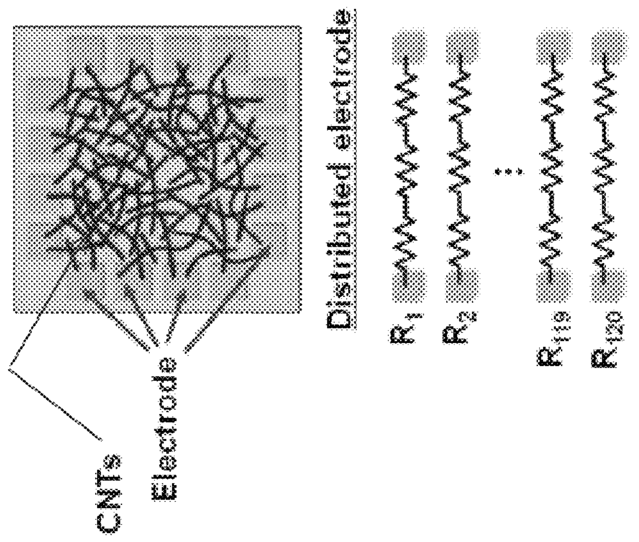

CNT networks have found applications including thin film transistors, energy storage devices, displays and sensors. The CNT network serves as a channel in most cases with two electrodes at both ends of the network, reading one resistance as shown in FIG. 1A. However, the present invention includes a method of reading multiple resistances by placing multiple electrodes around a single CNT network as shown in FIG. 1B. Each nanotube in a CNT network can be a conduction path, and the resistance can vary depending on the location of the electrode pair. When there is only one electrode pair in the CNT network, the connection with the lowest resistance among the various conduction paths becomes the dominant conduction path. In contrast, if a plurality of electrode pairs is arranged in the network, then various resistance values according to the electrode pair can be generated. As summarized in FIG. 1C, as the number of electrodes placed in the CNT network increases, a resistance with a very different range of values can be read. Even with CNT ink of the same purity and concentration, there is an inevitable variation between conduction paths located inside the CNT network, which is due to the randomness of the metallic/semiconducting fraction, network formation and nanotube density. Inter-device and intra-device (device-to-device) variability, which has posed huge challenges for commercialization of CNT applications, is harnessed here for the PUF application.

Figure 2A:
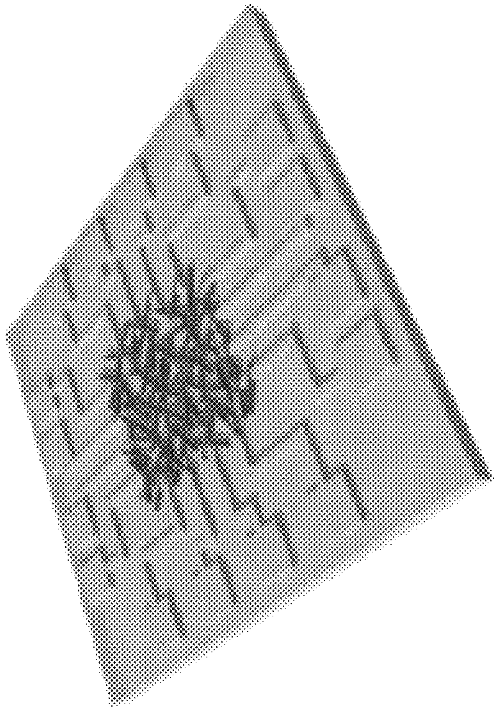
FIGS. 2A-2G show an all-printed PUF based on a single CNT network.
Figure 2B:
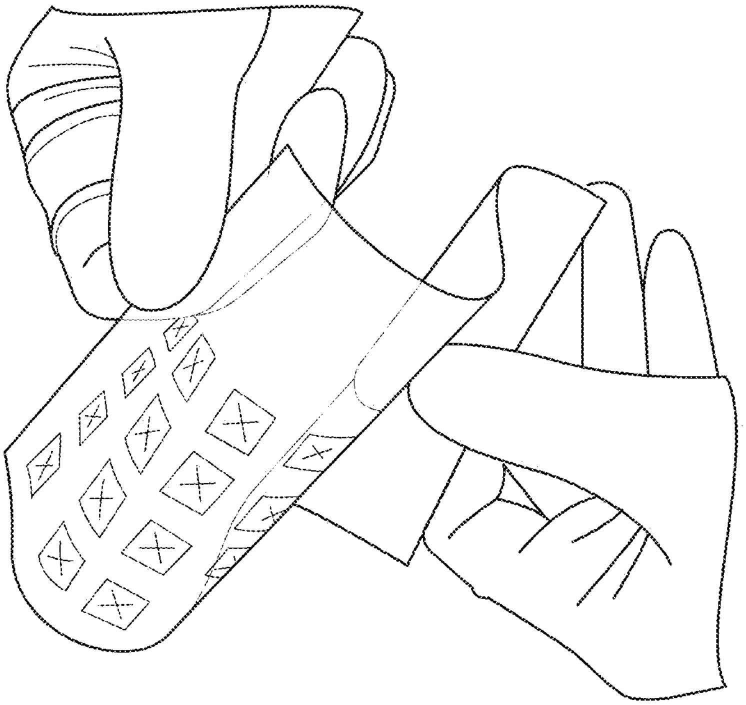
Figure 2C:
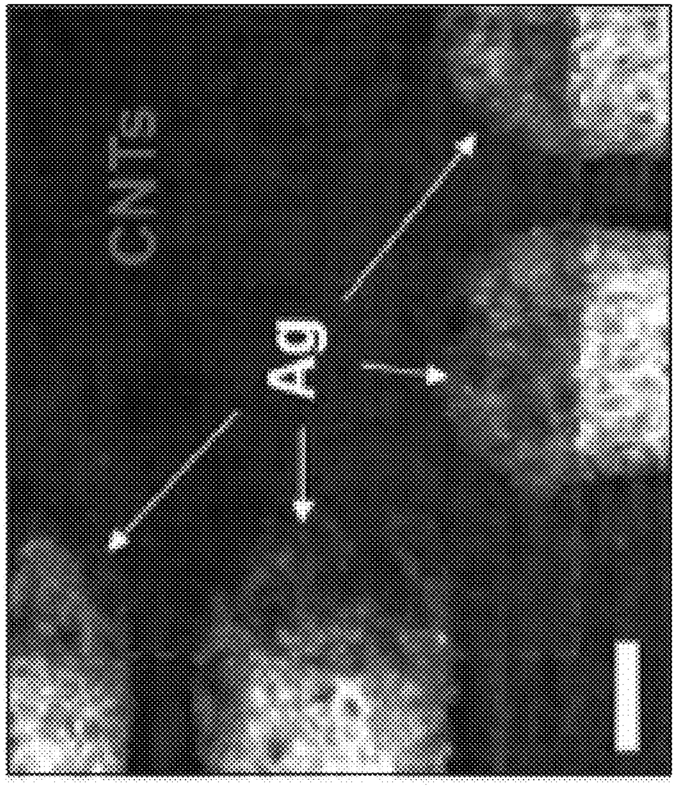

FIG. 2A shows an all-printed PUF formed with a CNT network and 16 silver electrodes along the edges of the device. Semiconducting CNT and metallic silver inks were respectively printed on a polyimide (PI) film for electrodes and random resistors (FIG. 2B). Images of a silver electrode and a CNT network are shown in FIGS. 2C and 2D. Various CNT films were formed by various printing methods such as drop casting and plasma jet as well as inkjet deposition and the randomness of each process was (see Table 1). In addition, other deposition methods used in semiconductor processing and printing techniques can be combined. For example, the CNT PUF can be augmented to the back-end-of-line part of CMOS processing, as high temperature processing is not required. Roll-to-roll based approaches, screen, gravure, offset, flexographic printing, and combination of them can also be used to produce the CNT PUF. Furthermore, the design of the CNT PUF presented here is an example and can be modified to various forms depending on the number and arrangement of the electrodes.

TABLE 1

Summary of various printing methods for CNT PUFs.

| Printing method | Drop-casting | Inkjet | Plasma jet |
|---|---|---|---|
| Output | Ink | Ink | Aerosol |
| 2D surface | O | O | O |
| 3D surface | X | X | O |
| Post-treatment | O | O | X |

Figure 2E:
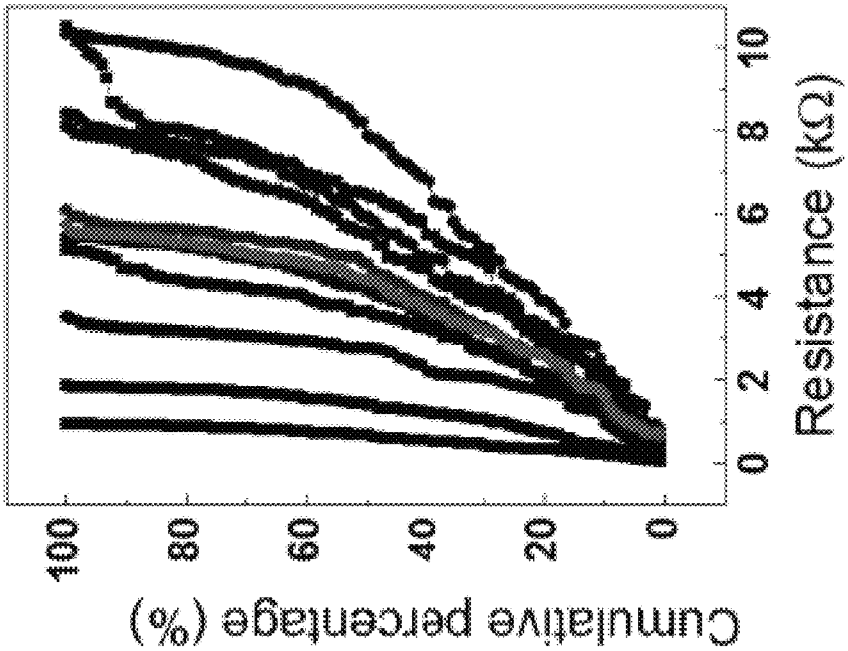
Figure 2D:
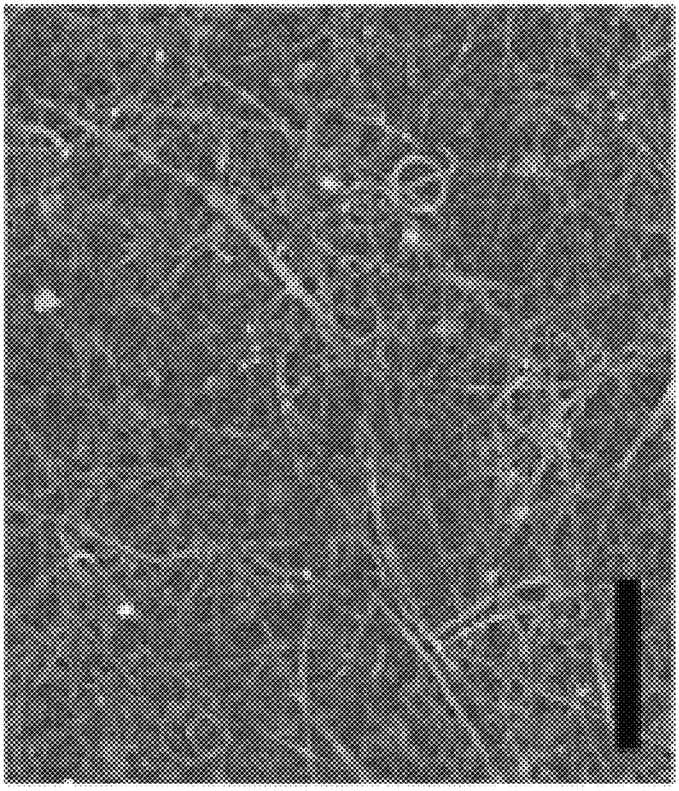
Figure 2G:
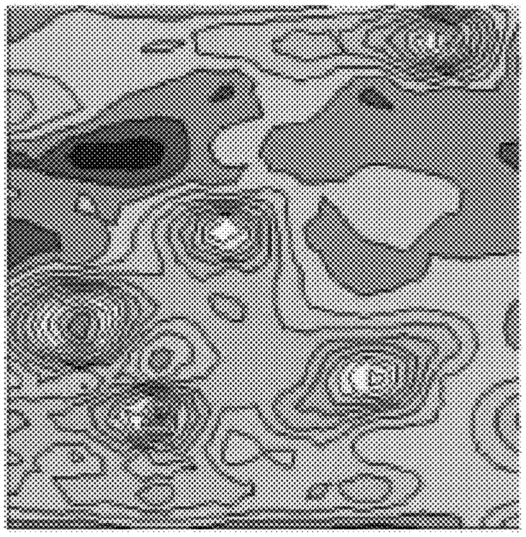
Figure 2F:
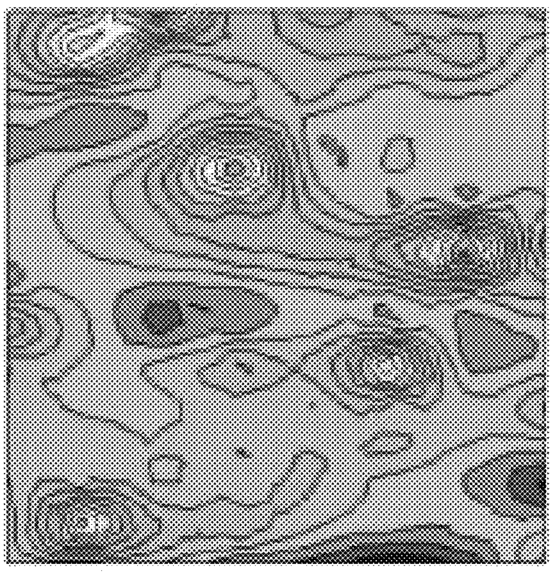

The raw data extracted from the CNT PUF is plotted in FIG. 2E. A resistance is measured from any electrode pair in the CNT network and the measurement is repeated for all possible combinations of electrode pairs to create a dataset. When N electrodes are placed in the network, a total set of N (N−1)/2 independent measurements is possible. This approach is an effective way to get a lot of data from a given area of the network. As a result, 120 resistance values are extracted from 16 electrodes in one CNT network. The CNT PUF can have a wide variety of resistance values depending on the electrode design and the CNT network formation. In order to standardize this, the following method was used. First, resistance normalization was performed to produce unit distance in order to eliminate the length dependence, as the distance between the electrode pairs is different. Second, the units were transformed as the numbers were too large and the range was wide. The transfer function was f(x)=log (log(x)), which is commonly used in statistics. Third, a contour map was drawn based on the transformed data. In this work, the 120 data points obtained from one CNT PUF were arranged in a 15-by-8 matrix. In addition, the matrix can be properly arranged to match the security level and system requirement. In the case of digitized PUF, the comparison between PUFs can be made using binarized data, array of 1 and 0. However, since the proposed CNT PUF uses analog data, a method to compare the PUFs is needed. The resistance distribution may be visualized using a contour map, which provides a unique resistance pattern based on the electrode information. In other words, whereas conventional PUF key is a 1D stream of binary bits, the proposed PUF key is a 2D pattern of analog values. The contour maps were drawn from two devices with the closest range and distribution of resistance values in FIG. 2E. However, as shown in FIGS. 2F and 2G, these were converted into a completely different resistance patterns. Devices with a CNT network are almost unlikely to have the same resistance distribution, and even if they have a similar resistance distribution, the probability of resembling the resistance to the location inside the network is also very low. Therefore, the CNT PUF can be applicable for an identification of things in the same manner as a human fingerprint.

Figure 3A:
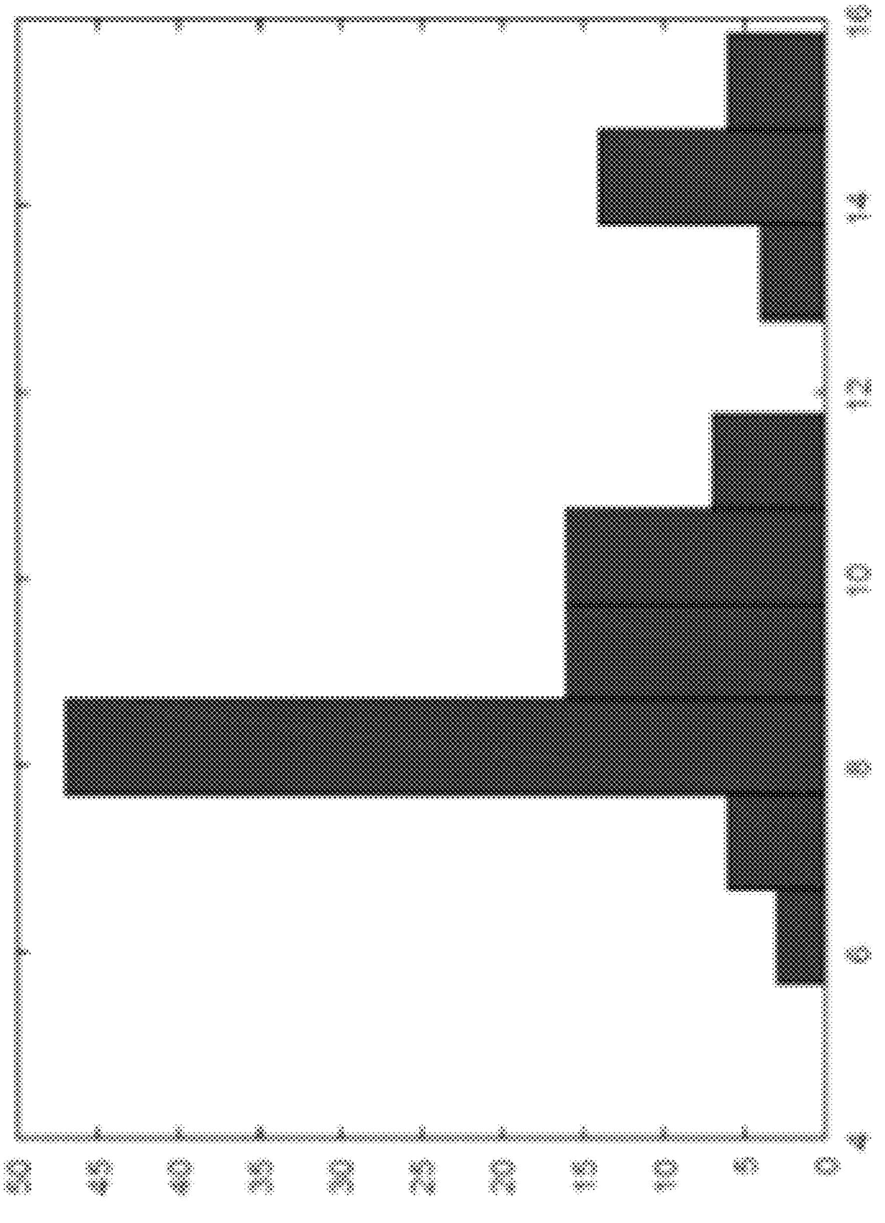
FIGS. 3A-3C show statistical analysis of CNT PUFs.
Figure 3B:
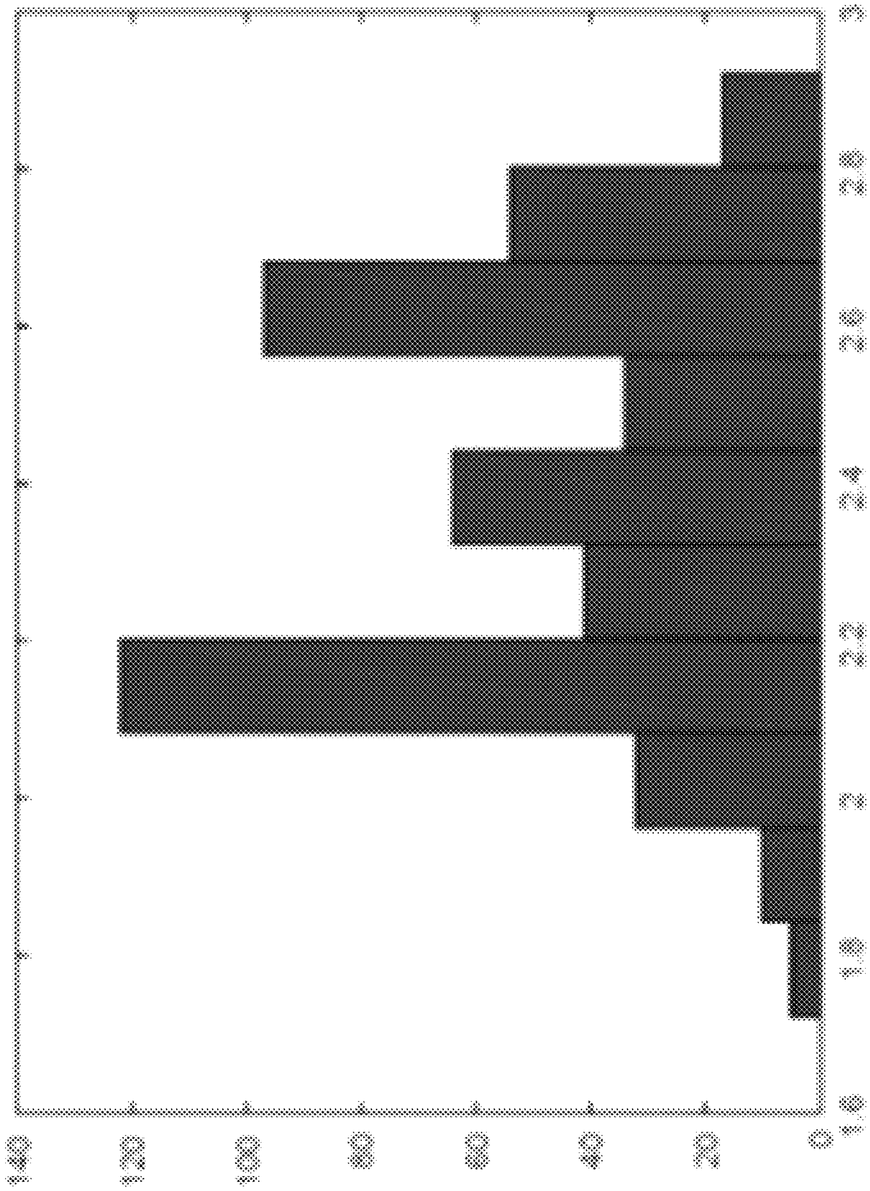
Figure 3C:
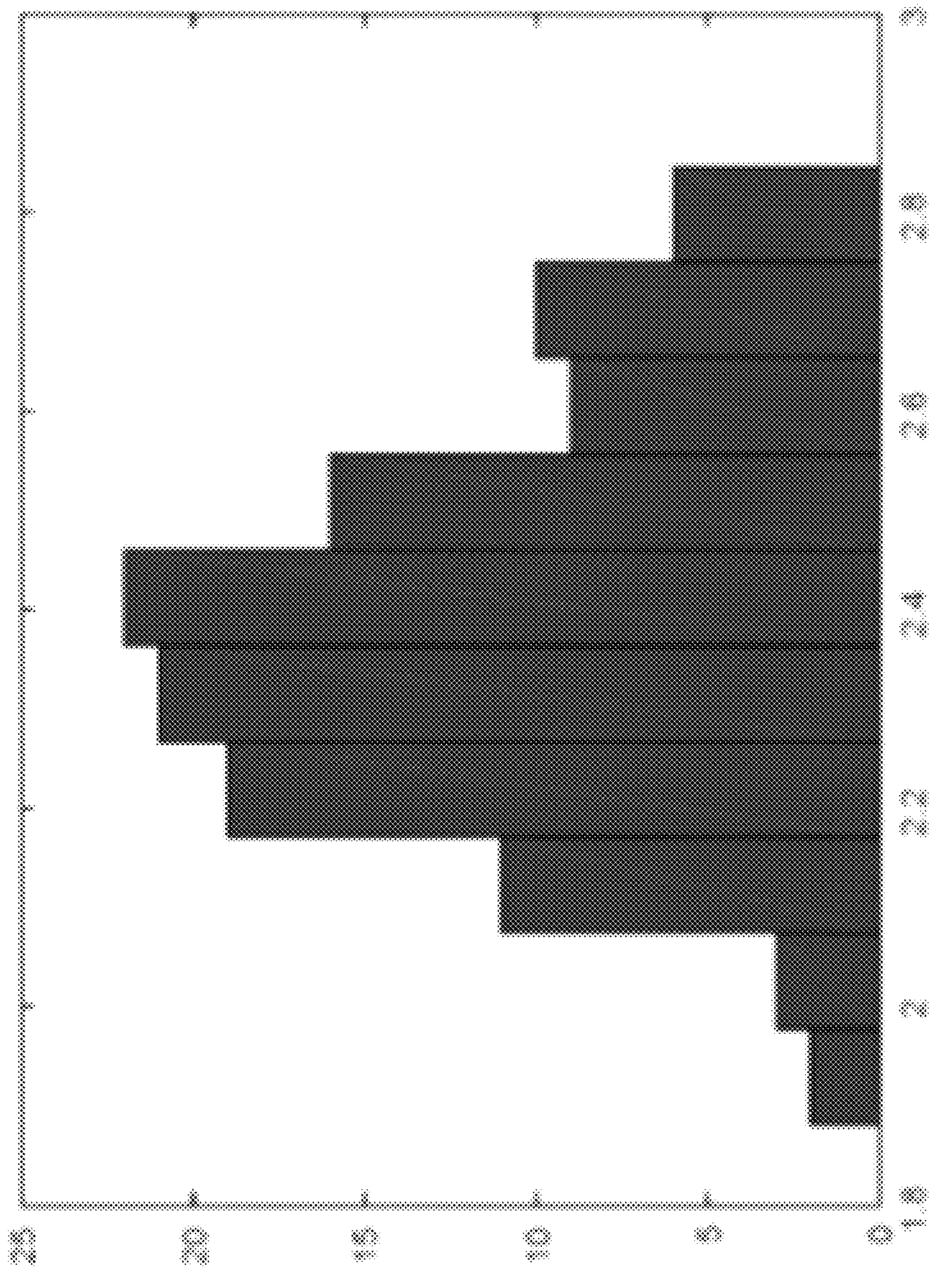

The NIST statistical randomness test suit cannot be applied to the proposed all-printed PUF, as the data set from the CNT network is analog. In order to evaluate the independence of the PUF samples, statistical analysis was performed based on transformed data sets. Four histograms were examined and were each found to have two modes. For example, the histogram of one sample is given in FIG. 3A. The histogram of the combined samples in FIG. 3B looks even less uni-modal although the histogram of the averaged samples in FIG. 3C seems to be almost unimodal. However, it is not clear at all if one can consider these samples as coming from the same distribution. As a matter of fact, the so-called Kruskal-Wallis test of the null hypothesis: all four samples have the same distribution, has the p-value about 0.01, i.e. this null hypothesis would be rejected at the traditional significance level of 0.005. It may be better from the point of view of PUFs for the distributions to be different, but then the issue of testing randomness of a sample from such varying multimodal distribution is problematic.

Figure 4A:
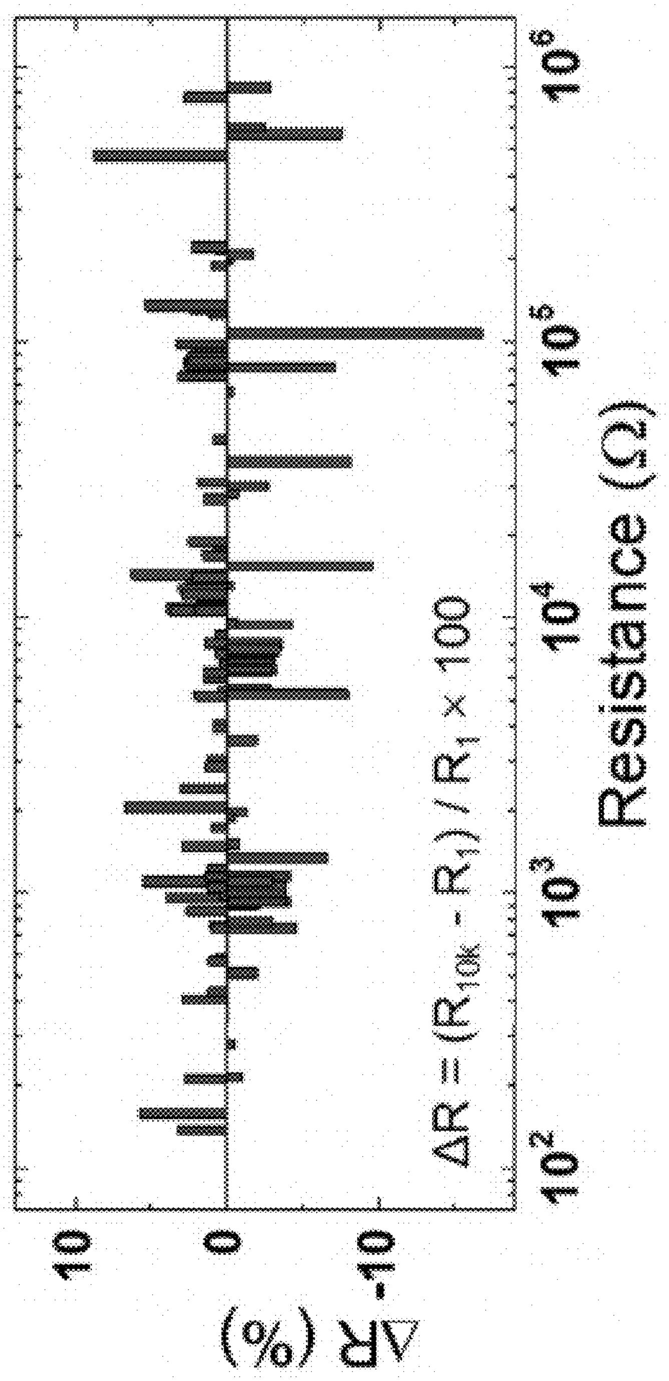
FIGS. 4A-4F show the robustness and stability of the CNT PUF.
Figure 4C:
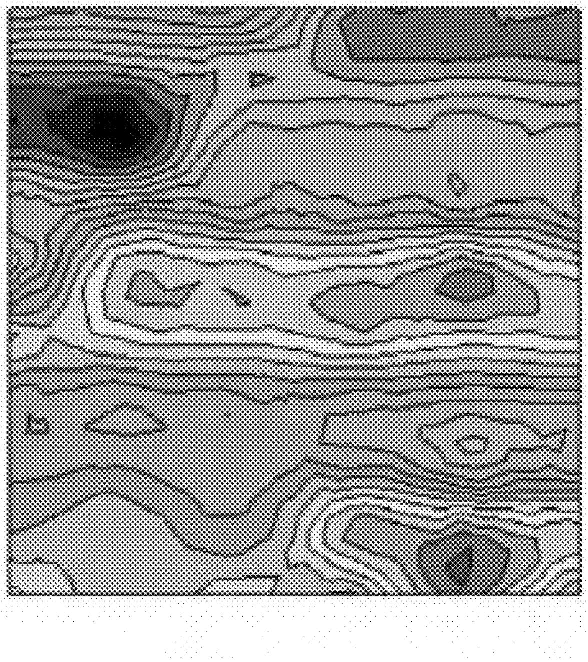
Figure 4B:
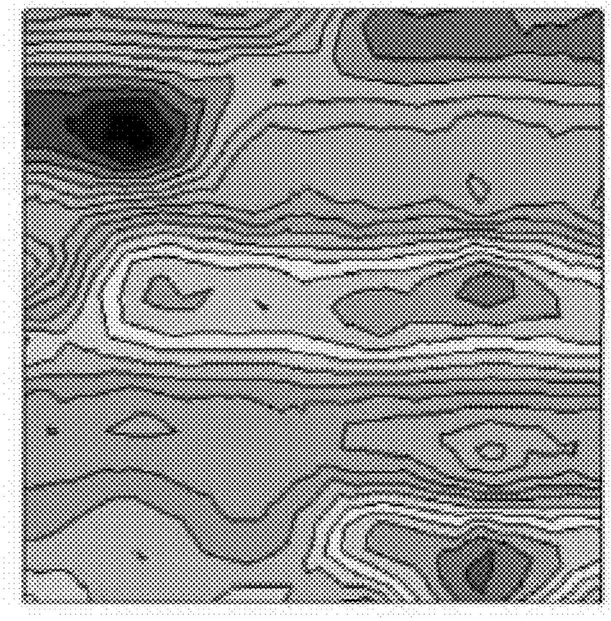
Figure 7:
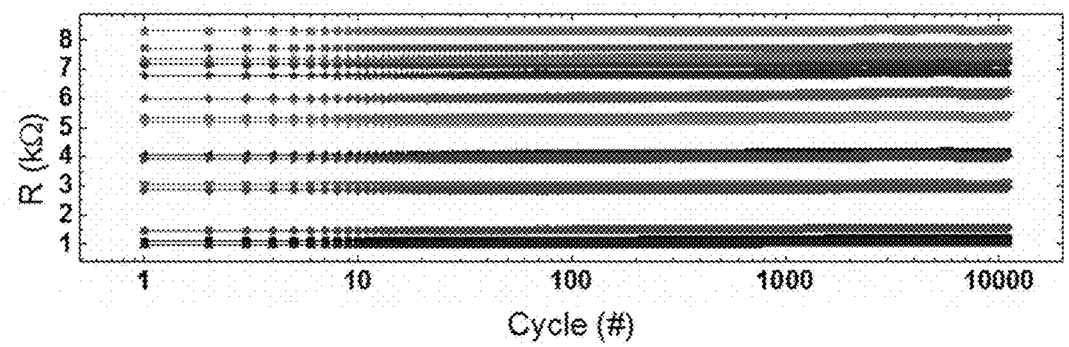
FIG. 7 shows the results of resistance (R) versus a number of measurements. Test results are from 15 CNT resistors sharing one electrode. There is no significant change in resistance over $10^4$ cycles.

PUFs should be unique, unpredictable, and unclonable. Also, the PUF once set should not change; that is, it should be robust against environmental changes and remain stable over time. As the CNT PUF uses analog data here, it can be an advantage in terms of reliability. In the case of the digitized PUF, there exists a reference criterion such as the voltage corresponding to 0.5 that distinguishes between 1 and 0. There is always a possibility of error when the bit happens to be flipped. Therefore, there must be a method to correct these errors. Likewise, the instability of the CNT may give rise to changes in its resistance by any unpredictable environmental change, which could also be unlawfully utilized to tamper the PUF. However, the PUF here solves these problems by using the relative difference between the adjacent resistances rather than using the absolute value obtained from the electrode pair. FIG. 4A shows the resistance distribution of the CNT PUF as in the initial state and after 10k readings. The raw data for each measurement point is plotted in FIG. 7. Some resistance values changed due to repetitive electrical stresses, but there is no significant difference in the resistance pattern (FIGS. 4B and 4C). The maximum increase and decrease among CNT resistors were 8.7% and −16.7%, respectively, but the image matching test showed only 0.3% difference (see the image matching test of the Supporting Information for more details). Therefore, the resistance patterns can be distinguished if the difference between adjacent resistances is maintained at a certain level. The tolerance of the error may vary depending on the application, and this can be used to set the level of security.

Figure 4D:
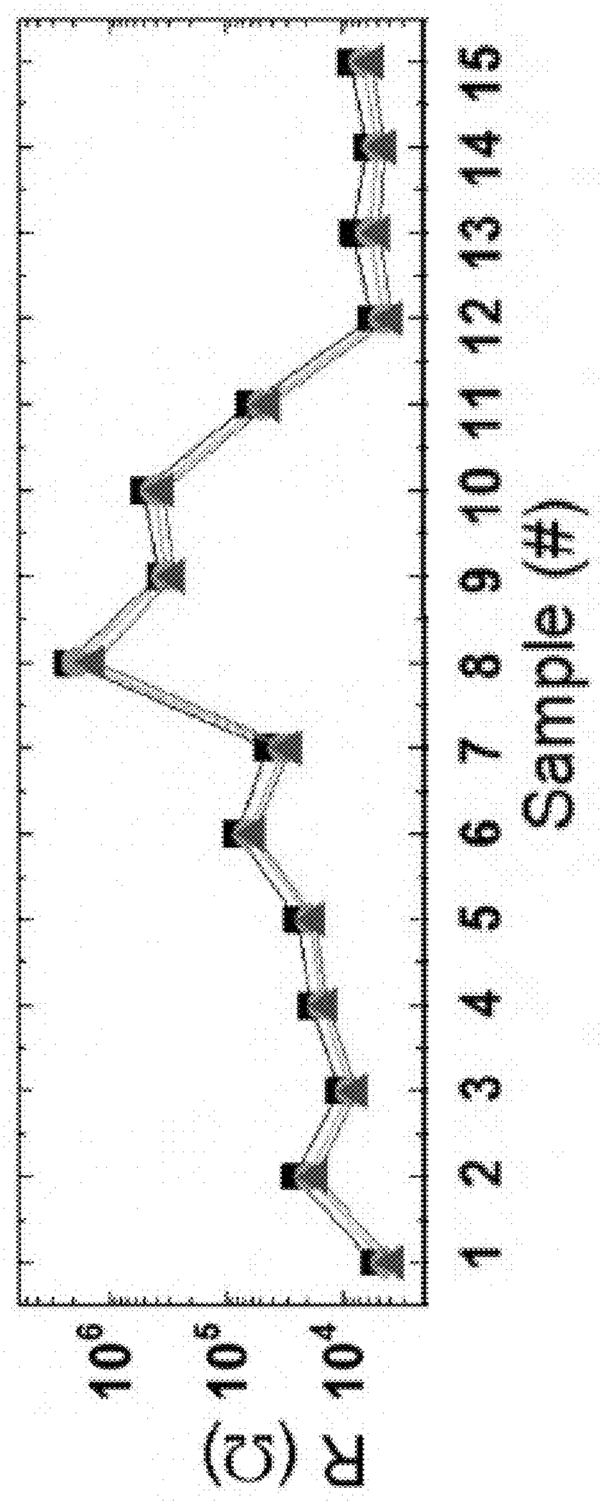
Figure 4E:
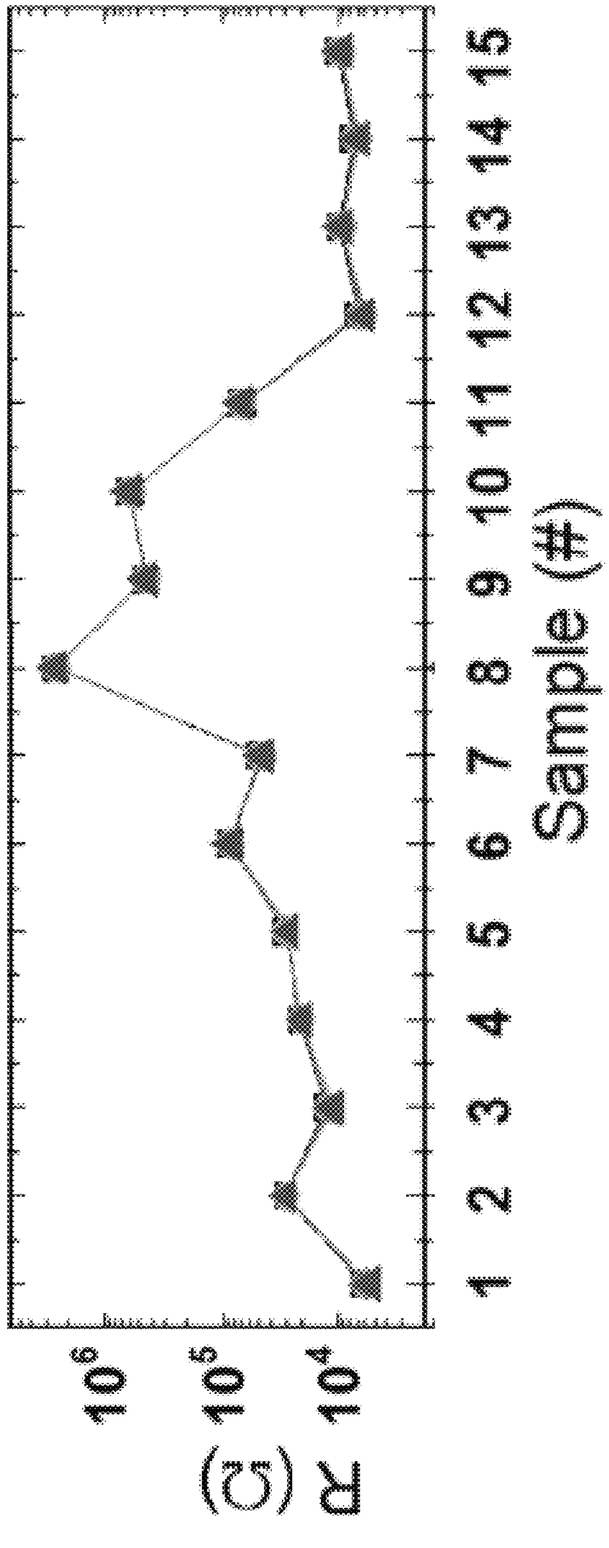
Figure 9B:
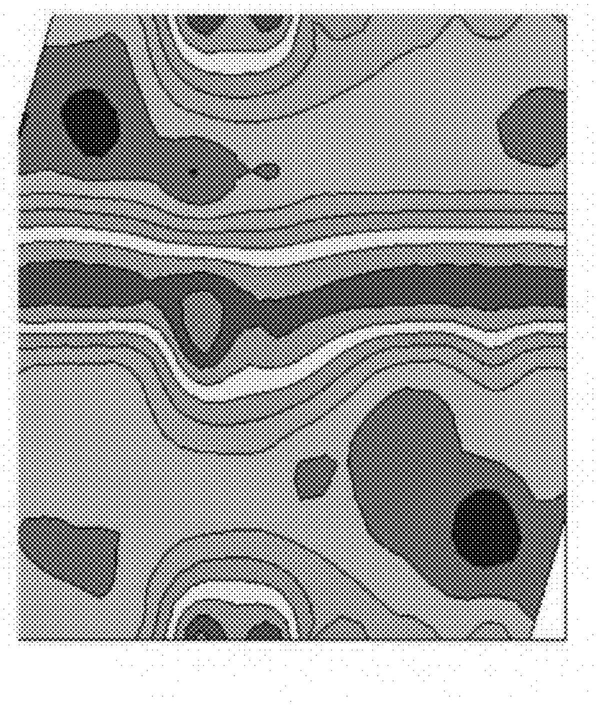
FIGS. 9A-9B show the results of a radiation experiment.
Figure 9A:
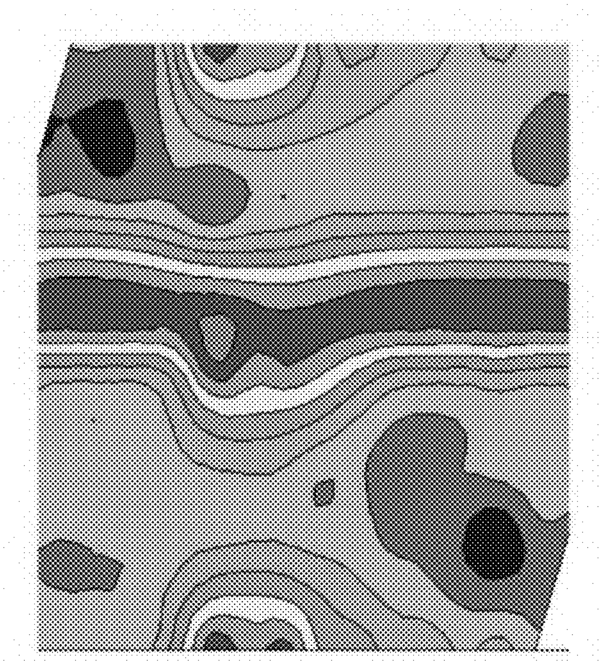

In the case of the endurance test, the resistance value of each resistance tends to alter because the electric stress is applied locally. In contrast, the effects of temperature and light act globally, and the resistance values can move in one direction (FIGS. 4D and 4E). When the temperature was increased from 25° C. to 80° C., the resistance decreased by 33% on average, but the resistance pattern remained unchanged. In addition, there was little difference resulting from the degree of light exposure including ultraviolet (UV) light. The local resistance change inside the CNT network has little effect on the overall pattern. In addition, when a resistance change occurs in the entire CNT network, all resistances are affected together, so that the unique pattern is maintained. One more aspect to consider is the robustness of the CNT PUF to radiation. When a large number of devices in the aviation environment are considered in the future, such as chip scale satellites and drones for example, a high level security system capable of identifying each entity in a harsh environment will be required. Similar to electrical stress, radiation can cause localized damage to the CNT PUF. CNTs may be damaged by high energy waves or particles, but the risk is definitely reduced compared to silicon. As can be seen in FIG. 4G, the resistance pattern remained unchanged after exposure to gamma rays of 100 krad(Si). The detailed radiation experiment and full-sized contour maps of the pre-radiation and post-radiation network can be found in FIGS. 9A and 9B. Also, this result indicates that the CNT PUF has sufficient radiation tolerance for most space missions since the total dose in 10 years geostationary orbit (GEO) and 5 years low earth orbit (LEO) mission is respectively 50 krad(Si) and 20 krad(Si). In addition, the all-printed CNT PUF meets the specifications required for the radiation-hardening design without any effort to suppress the radiation damage. The CNT PUF exposed to various environmental changes can read the assigned resistance pattern as long as the distribution is maintained even if some data changes. This not only has the advantage of keeping security keys stable, but also for maintaining robustness against security attacks. As can be seen in FIG. 2D, it is impossible to duplicate the CNT network or to find the internal resistance distribution without accessing the device. A local physical attack can destroy a device, but it cannot infer the entire resistance distribution. Even if there is an attempt to tampering a device globally using temperature, light, etc., the entire CNT network changes together, so that security can be maintained.

Device Fabrication

Figure 5:
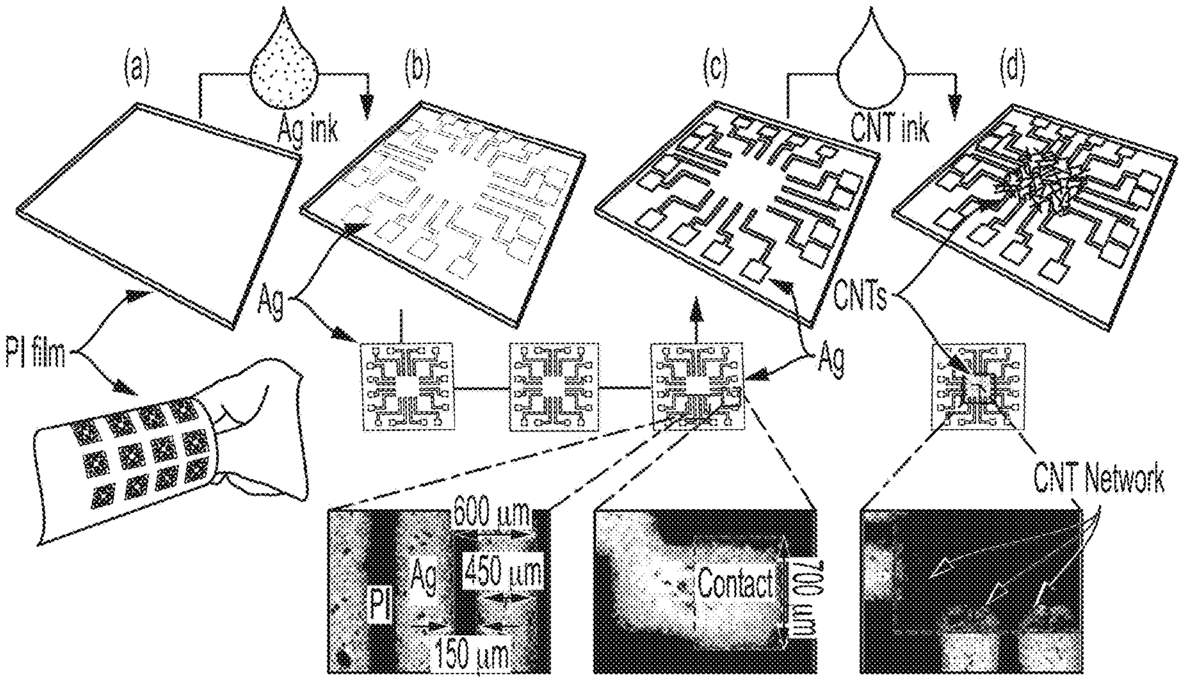
FIG. 5 shows device fabrication steps with corresponding images. Step (a) shows the PI substrate. Step (b) shows the As— printed Ag electrodes. Step (c) shows the Ag electrodes after the sintering process. Step (d) shows the CNT network formation. The area of the CNT network and PUF device was 2.5 mm×2.5 mm and 1 cm×1 cm, respectively. But the device size can be varied depending on the design and application.

FIG. 5 shows the process steps and images of the fabricated device. The device fabrication totally relied on the printing technology using commercial equipment (FUJIFILM Dimatix DMP-2830). Polyimide (PI) film was selected as substrate due to its thermal stability over 200° C., good chemical resistance and excellent mechanical properties (FIG. 5, step a). Metallic and semiconducting material inks were used for the electrode and PUF layer, respectively. A conductive Ag ink (InkTec, TEC-IJ-060) was used for metal contacts and interconnection lines (FIG. 5, step b). The viscosity and surface tension of the Ag ink ranged from 5 to 15 cps and 27 to 32 dynes/cm at 25° C., respectively. The bulk silver resistivity was 1.6×10-6 Ω·cm after the curing process at 130° C. for 10 min done to obtain high electrical conductivity (FIG. 5, step c). In this process, the color of the Ag patterns changed from translucent to shiny metallic. The sixteen individual Ag electrodes were printed in a concentric fashion, with 450 μm line width and 150 μm spacing. Each silver pad was 700 μm×700 μm in area with 900 μm spacing. Pristine SWCNT powder (Nanostructured & Amorphous Materials) was used to synthesize the semiconducting ink for the PUF layer. 40 mg of purified SWCNTs were dispersed in 20 mL of deionized water. The solution was then sonicated for 2 hours to disperse and shorten the nanotubes by breaking them at any defects already present. 69.7% wt $HNO_3$ was then slowly added to form a 40 mL 8 M $HNO_3$/SWCNT solution. The mixture was refluxed at 120° C. for 4 days. Then, the SWCNT solution was diluted with DI water, centrifuged and washed three times to remove any remaining $HNO_3$. The SWCNT film was then printed to overlay the Ag electrodes with the film bridging arbitrary pairs of Ag electrodes, followed by natural drying at room temperature (FIG. 5, step d).

CNT Deposition Method

When printed electronics technology matures, IoT devices can be built through material printers or 3D printers. In order to consider the fabrication versatility of the proposed PUF, CNT networks were formed by other deposition methods besides inkjet printing. A simple way to form a CNT network is by drop-casting, which does not require expensive and special equipment; it can be used for personal and small-scale production of PUF devices. However, this method has limitations in terms of precision and miniaturization. The inkjet printing has advantages in terms of digital design (maskless and drop on demand), on-the-fly error correction, low ink consumption and a wide range of inks. It also allows printing on various substrates through the non-contact method, but there is a limit to forming a pattern on a 3D surface. The recently developed plasma jet printing can overcome the limitations of the inkjet method. The inkjet prints the pattern in liquid form, while the plasma jet ejects nanomaterials in an aerosol form from a low temperature plasma. Also, the atmospheric pressure plasma-based process allows the formation of a uniform film and removing organic contaminants without post-deposition thermal treatment, vacuum pump and the vacuum chamber. Thus, the plasma jet printing is suitable for coating 3D objects. The comparisons of CNT PUFs by drop-casting, inkjet and atmospheric pressure plasma jet method are summarized in Table 1. It was confirmed that unique patterns were formed regardless of the CNT deposition methods. The inkjet method can be applied to substrates such as plastic and glass, and the plasma jet method can be optimized on paper, fabric and 3D surfaces. In addition, the CNT PUF can be realized by other printing techniques or as an add-on feature in semiconductor fabrication. Therefore, the proposed CNT PUF has the potential for a broad range of applications in flexible electronics, wearable devices and conventional IC technology.

PUF Characterization

Figure 6A:
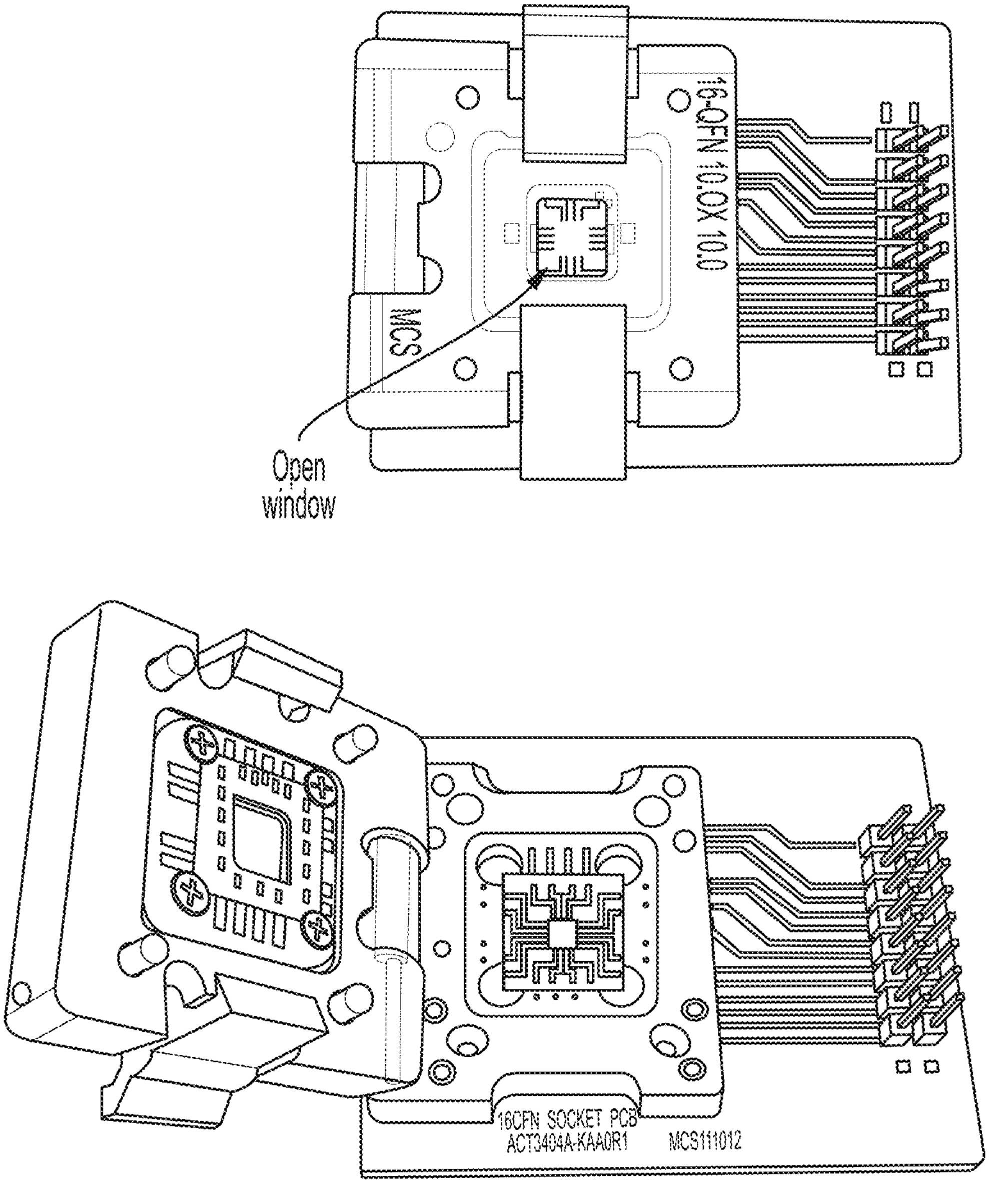
FIGS. 6A and 6B show a multi-channel automatic measurement system.
Figure 6B:
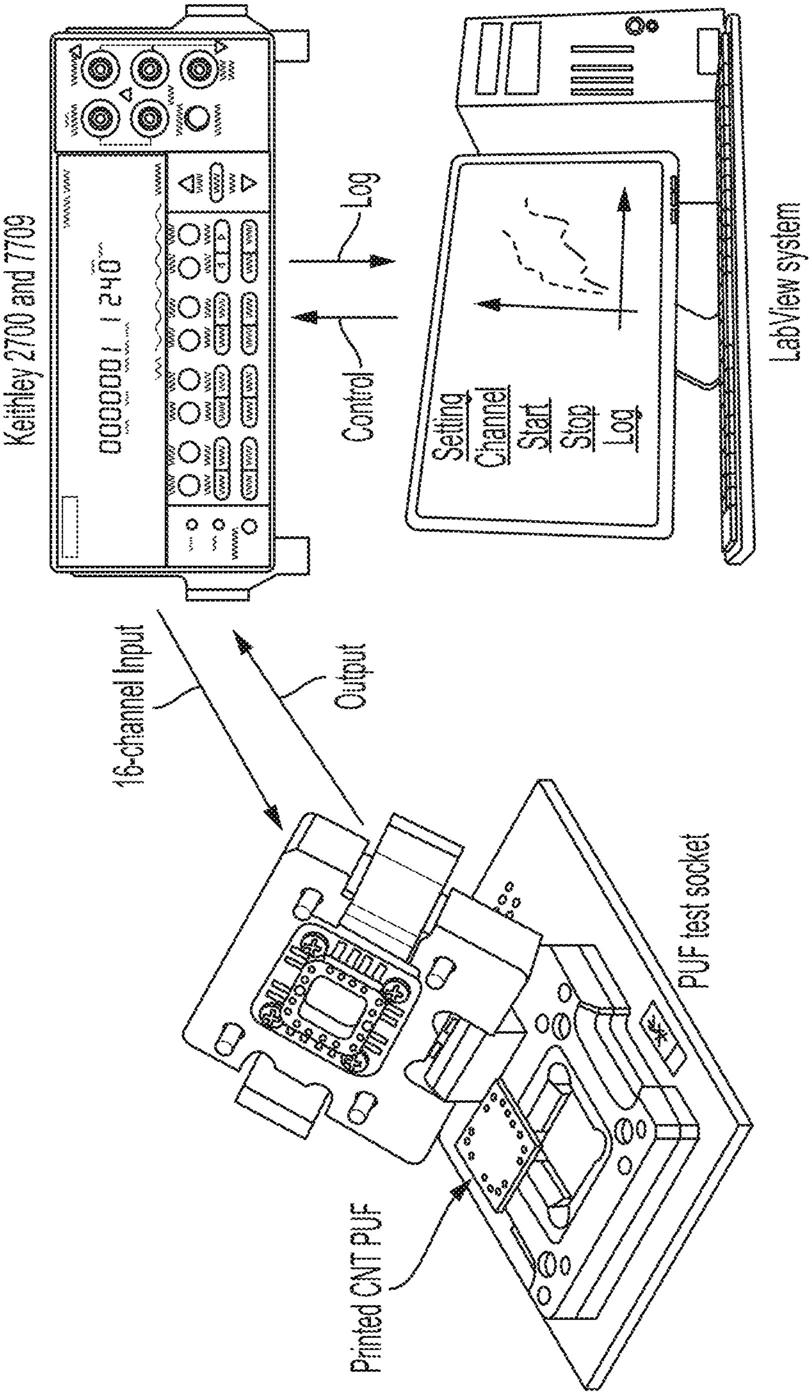

Measurement setup. The fabricated PUF chip was mounted on a clamp-shell type test socket for electrical measurements (FIG. 6A). There is an open window in the middle of the test socket to examine physical tampering such as temperature, light illumination and radiation attack. A computer-based automatic measurement system was custom-built for PUF characterization. The PUF test socket was directly linked to a multimeter (Keithley 2700) through switching matrix module (Keithley 7709) in order to serially measure multiple data. The overall operation, i.e., the 16-channel input signal and output data, was simultaneously controlled and logged by the computer (LabView) system (FIG. 6B).

Figure 1C:
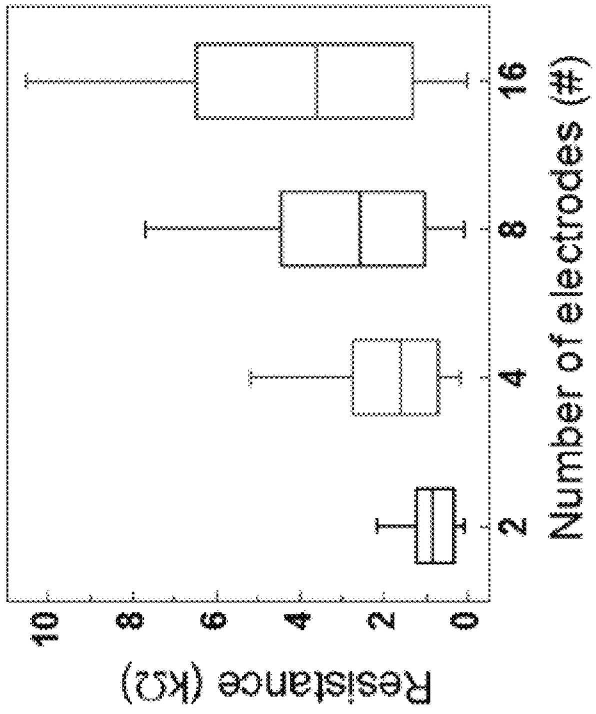

Electrode distribution. The fabricated all-printed CNT PUF device has 16 independent electrodes on a CNT mat. In order to evaluate the resistance distribution according to the number of electrodes in the same CNT network, each electrode was electrically connected to the necessary number of electrodes. For example, two electrodes are tied together to convert sixteen electrodes into an eight electrodes configuration. In the case of FIG. 1C, two, four, eight, and sixteen electrodes were formed on one CNT mat by bundling eight, four, two, and one electrode, respectively. In the CNT network, the equivalent resistance (Req) of one electrode pair is given by Equation 1 because a plurality of resistors is connected in parallel between two electrodes.

$$\frac{1}{R_{eq}} = \frac{1}{R_1} + \frac{1}{R_2} + \dots + \frac{1}{R_{p-1}} + \frac{1}{R_p} \quad (1)$$

$$p = n = \frac{N(N-1)}{2} \quad (2)$$

The number of electrode pairs (n) that can be constructed through the number of electrodes (N) in one system is given by Equation 2. The fabricated CNT PUF device provides 120 resistance values through 16 electrodes. This is also the same as the number of resistors (p) connected in parallel when a plurality of electrodes is combined into one electrode pair. Accordingly, the number of resistors connected in parallel to one electrode pair is 120, 28, 6, and 1 in 2, 4, 8, and 16 electrode configurations, respectively. The parallel connection of the resistors is smaller than the smallest of the resistances connected in an electrode pair. Therefore, the internal resistance value of the CNT network converges to a lower resistance value as the number of electrodes pairs decreases, that is, as the number of CNTs connected in parallel increases.

Endurance test. The resistance of the all-printed CNT PUF was read repeatedly to evaluate the electrical reliability. The resistance was recorded for each measurement, and the results of some resistances are plotted in FIG. 7. It can be seen that the resistance change between each measurement is negligible. Also, the first and 10,000th resistance measurements are compared in FIGS. 4B and 4C.

Figure 8:
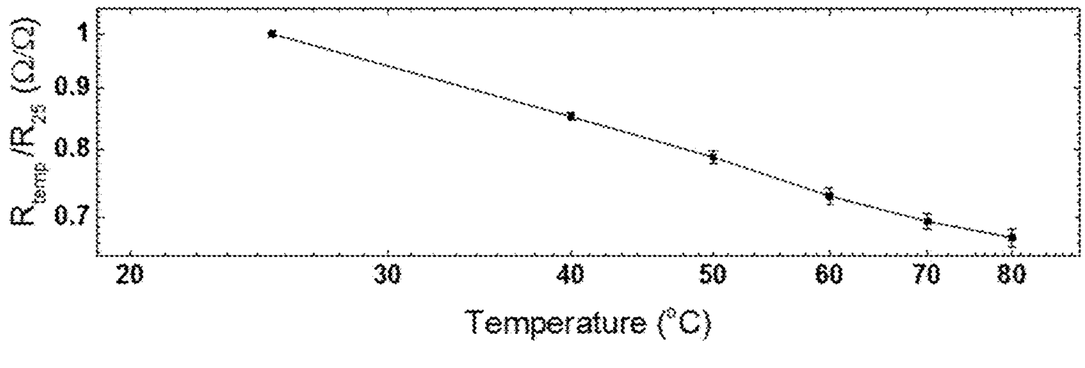
FIG. 8 shows temperature dependence. CNT resistance at a given temperature ($R_{temp}$) is normalized to that at 25° C. ($R_{25}$) for comparison. The error bar is the standard error of mean calculated from 15 samples.

Temperature test. We experimented with a furnace (NEYTECH Qex) to see the resistance change of the CNT PUF with temperature. A test socket containing the printed device was placed in the furnace and the socket was connected to the multimeter through an electrical lead. The temperature was divided into 6 sections from 25° C. to 80° C. and the resistance of the CNT PUF was measured after each temperature was stabilized. Under the experimental conditions, the resistance of the each CNT path varied similarly with temperature (FIG. 8).

Light test. In order to investigate the effect of light on the CNT PUF, the change of resistance according to the light source was measured. All measurements were made in real-time while the light was being irradiated on the device. An EPROM eraser (LEAP ELECTRONIC Co., LTD, Model LER-121A) was used as the ultraviolet (UV) source, and the device was irradiated with a wavelength of 254 nm and an intensity of 2.8 $mW/cm^2$. The effect on the visible light was measured under a general fluorescent lamp. Also, the resistance of the CNT PUF was measured in a dark environment where the light was blocked.

Figure 4F:
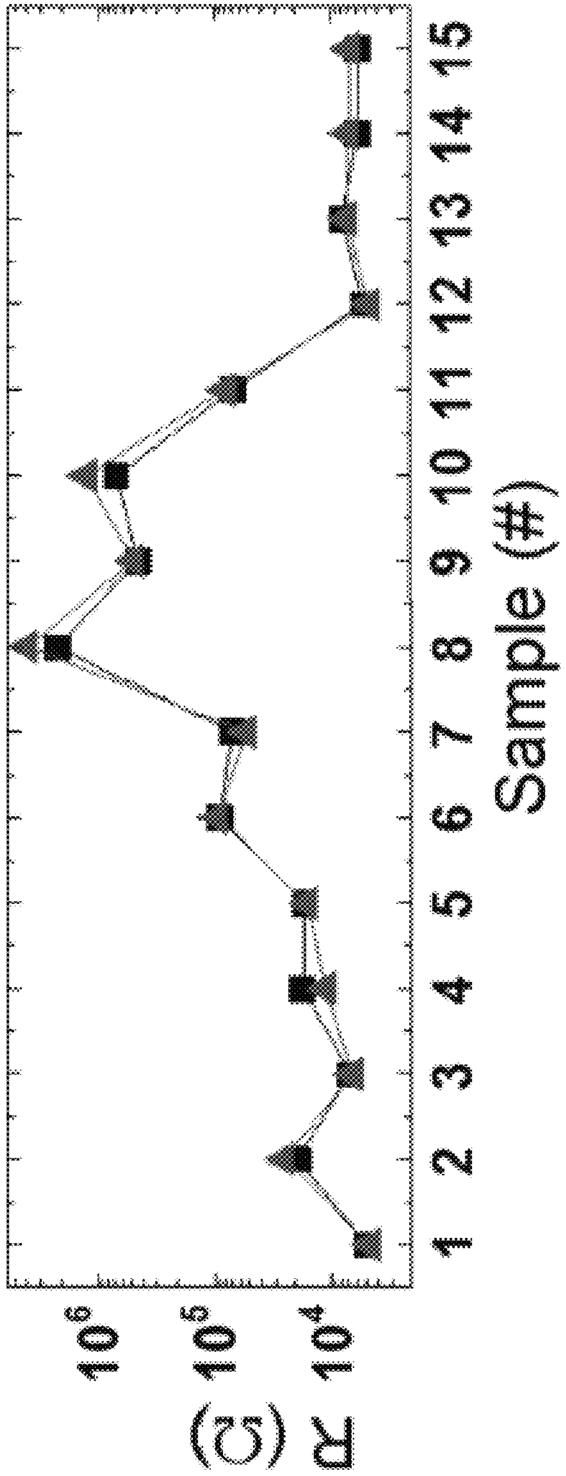

Radiation test. The radiation damage of the all-printed CNT PUF was evaluated with Cs-137 source that emits gamma rays with a nominal energy of 0.66 MeV. The dose rate from the irradiator was 60 rad/sec and the total delivered dose was 100 krad. In the case of radiation test, no measurements were performed during exposure to radiation, but resistances from pre-radiation and post-radiation conditions were measured. The point data and the contour map of each case are compared in FIG. 4F and FIGS. 9A and 9B, respectively.

Image matching test. In order to quantify the similarity of the color contour maps of different PUF samples, the image comparison software (Prismatic Software Dup Detector v3.0) was used. The software creates a data file by opening and reading image pixel data for each image. It then finds similarity between PUF images by % match. The matching algorithm used in this work was the Euclidean distance. The method for comparing CNT PUF images requires optimization depending on the degree of security and the hardware system. In addition, in order to use the CNT PUF as a security key, it is not necessary to convert into an image, and various other methods can be considered.

The invention claimed is:

1. An all-printed physically unclonable function electronic device comprising:

a substrate;

a nanomaterial deposited, dried, and randomly tangled on said substrate;

a plurality of electrodes attached to said substrate along a perimeter of said substrate, said all printed physically unclonable function electronic device configured as a portable and unique digital fingerprint.

2. A device according to claim 1, further comprising a coating of passivation film to protect said device from ambient moisture.

3. A device according to claim 1, further comprising a coating of passivation film to protect said device from ambient light.

4. A device according to claim 1, wherein each combination of two of said plurality of electrodes yields a random resistance when a current is applied to said each combination of two of said plurality of electrodes.

5. A device according to claim 1, wherein a first resistance value of a first pair of said plurality of electrodes yields a low cross correlation with a second resistance value of a second pair of said plurality of electrodes.

6. A device according to claim 1, wherein said nanomaterial is carbon nanotubes.

7. A device according to claim 1, wherein said nanomaterial is carbon nanowires.

8. A device according to claim 1, comprising a single carbon nanotube network deposited on said substrate.

* * * * *